(12) United States Patent
Tamura (10) Patent No.: US 7,308,691 B2
(45) Date of Patent: Dec. 11, 2007

(54) DISK APPARATUS WITH GUIDE MECHANISM

(75) Inventor: Tetsuya Tamura, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 546 days.

(21) Appl. No.: 10/854,644

(22) Filed: May 27, 2004

(65) Prior Publication Data

US 2005/0010938 A1    Jan. 13, 2005

(30) Foreign Application Priority Data

May 28, 2003    (JP)    ......................... 2003-003060 U
Sep. 11, 2003    (JP)    ......................... P 2003-319181

(51) Int. Cl.
    *G11B 17/03*    (2006.01)
(52) U.S. Cl. ...................................... 720/613
(58) Field of Classification Search ............... 720/613, 720/601

See application file for complete search history.

(56) References Cited

U.S. PATENT DOCUMENTS 5,930,218 A * 7/1999 Mitsui et al. ............... 720/613

FOREIGN PATENT DOCUMENTS

| JP | 52-160528 | 12/1977 |
|----|-----------|---------|
| JP | 57-57747  | 4/1982  |
| JP | A-5-266563 | 10/1993 |
| JP | A-11-328801 | 11/1999 |
| JP | 3094496   | 3/2003  |

* cited by examiner

*Primary Examiner*—David Davis
(74) *Attorney, Agent, or Firm*—Morgan, Lewis & Bockius LLP (57) ABSTRACT

An opposed interval between a pair of fore position regulating pieces forming a guide mechanism of the disk tray is made wider than the mutual interval between guide ways. The projecting width of the fore position regulating pieces is longer, its opposed interval being closer to the mutual interval between the guide ways. A front end portion of guide way is formed as an run-off guide way, the run-off guide way and the guide way being continuous on a nominal guide way. The open angle of the nominal guide way is decided in a range from 110° to 135°.

5 Claims, 7 Drawing Sheets

PRIOR ART

FIGURE 6

PRIOR ART

FIGURE 7

PRIOR ART

DISK APPARATUS WITH GUIDE MECHANISM

BACKGROUND OF THE INVENTION

1. Field of the Invention

The present invention relates to a disk apparatus, and more particularly to a disk apparatus in which the in-and-out movement of a disk tray for carrying a disk into a home position within a housing or out of the housing is guided by a guide mechanism having the guide ways provided on the disk tray and the position regulating pieces provided on the housing.

2. Description of the Related Art

Figure 5:
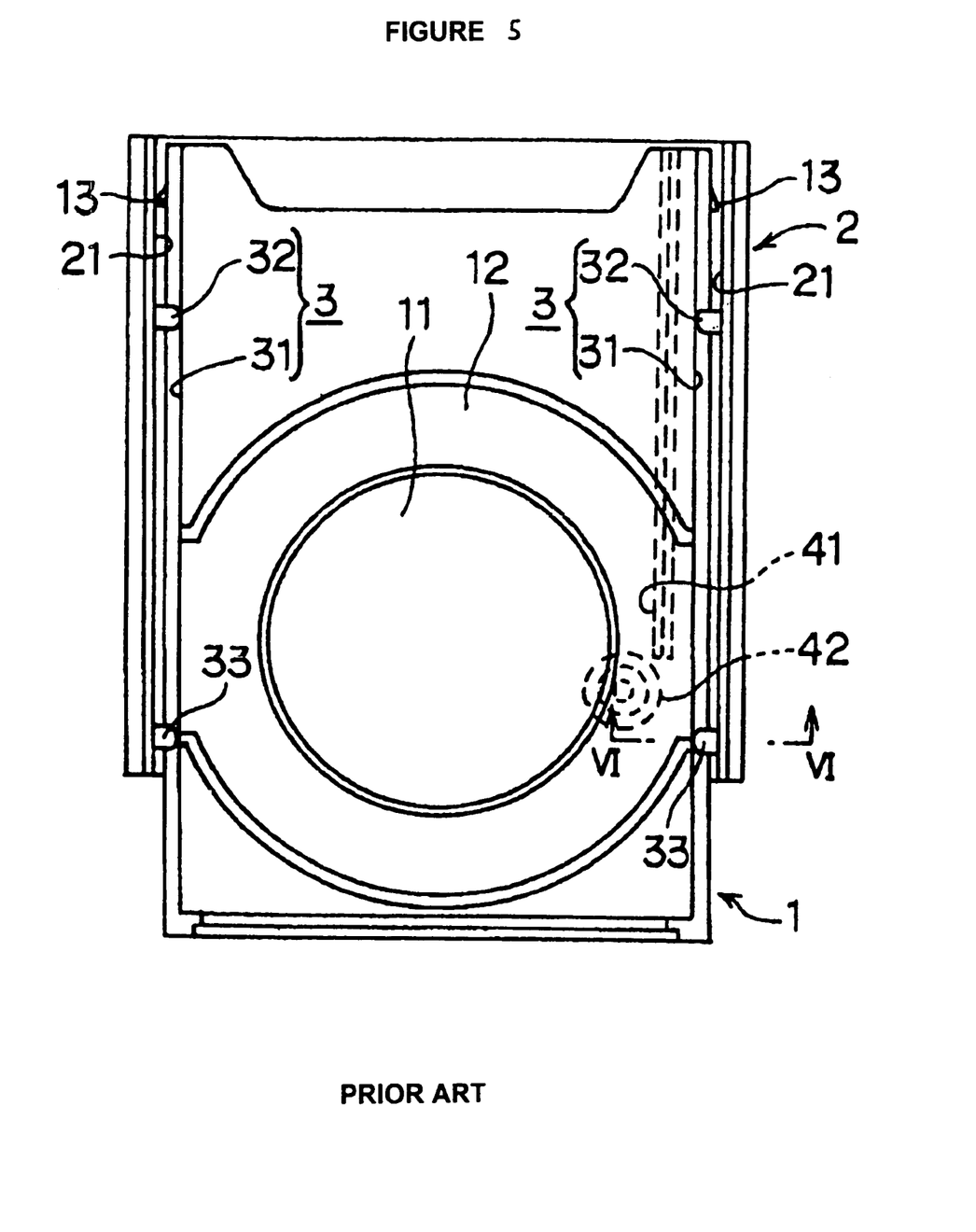
FIG. 5 is a schematic plan view of a conventional disk apparatus.
Figure 6:
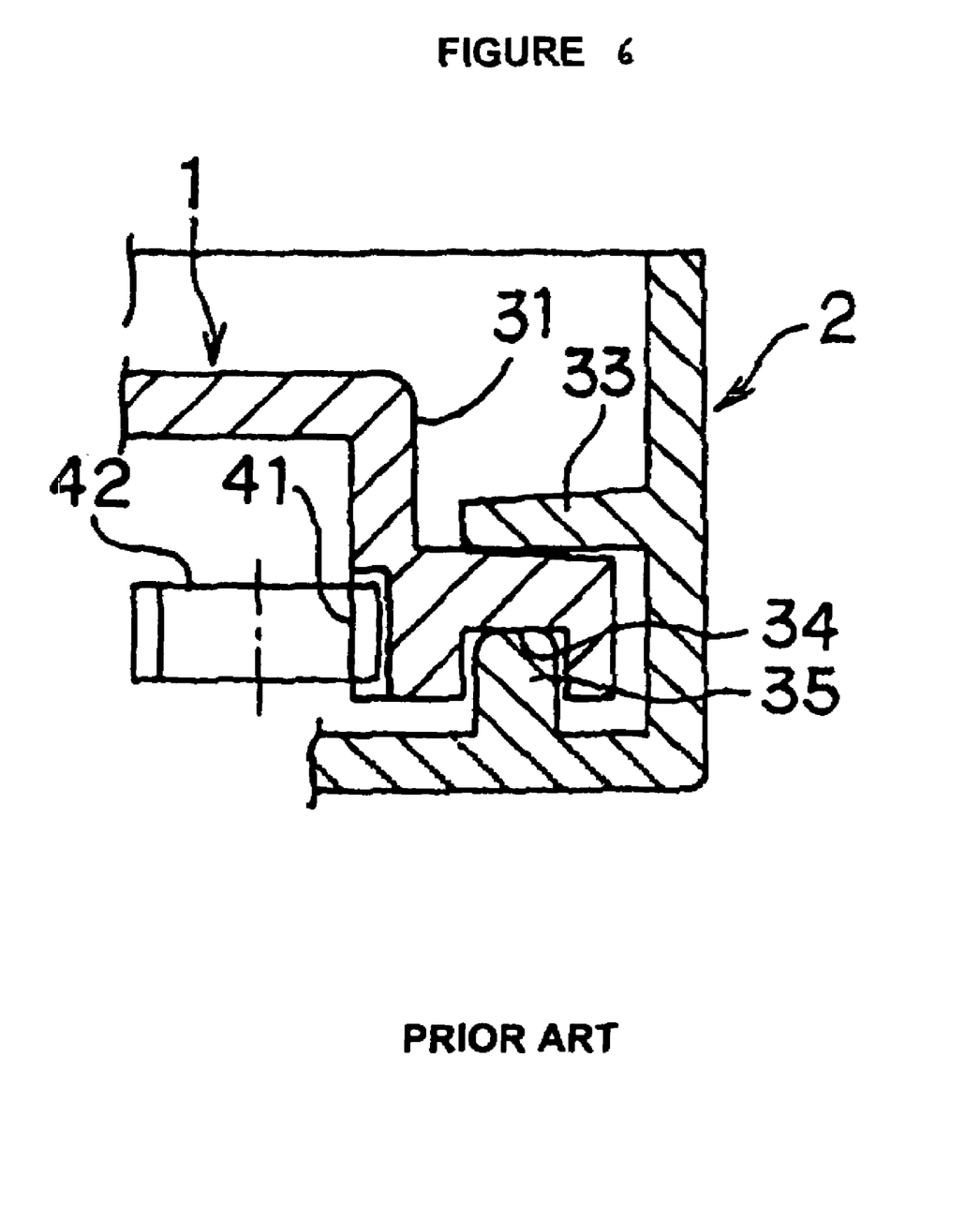
FIG. 6 is an enlarged cross-sectional view of a portion taken along the VI-VI line of FIG. 5.

FIG. 5 is a schematic plan view of a conventional example of a disk apparatus of this kind. In this disk apparatus, a disk tray 1 has disk loading faces 11 and 12 on which a small diameter disk and a large diameter disk are alternatively loaded, whereby the disk (not shown) loaded on any one of them is carried into the home position within a housing 2 or out of the housing 2. Also, the guide mechanisms 3 for guiding the in-and-out movement of the disk tray 1 into or out of the housing 2 are provided. The guide mechanisms 3 include the guide ways 31, 31 that are left and right parallel flat planes provided in the disk tray 1 and extending straightly in the direction where the disk tray 1 is moved in or out (back and forth direction), one pair of fore position regulating pieces 32, 32 like projections disposed oppositely to the left and right on the fore part of the housing 2, and one pair of rear position regulating pieces 33, 33 like projections disposed oppositely to the left and right on the rear part of the housing 2. Also, a guide groove portion 34 provided on the back side of the disk tray 1 and extending in the back and forth direction, and a guide projection 35 provided on the housing 2 and slidably fitted into the guide groove portion 34 are provided, as shown in FIG. 6, which is an enlarged view of a portion taken along the VI-VI line of FIG. 5.

Figure 7:
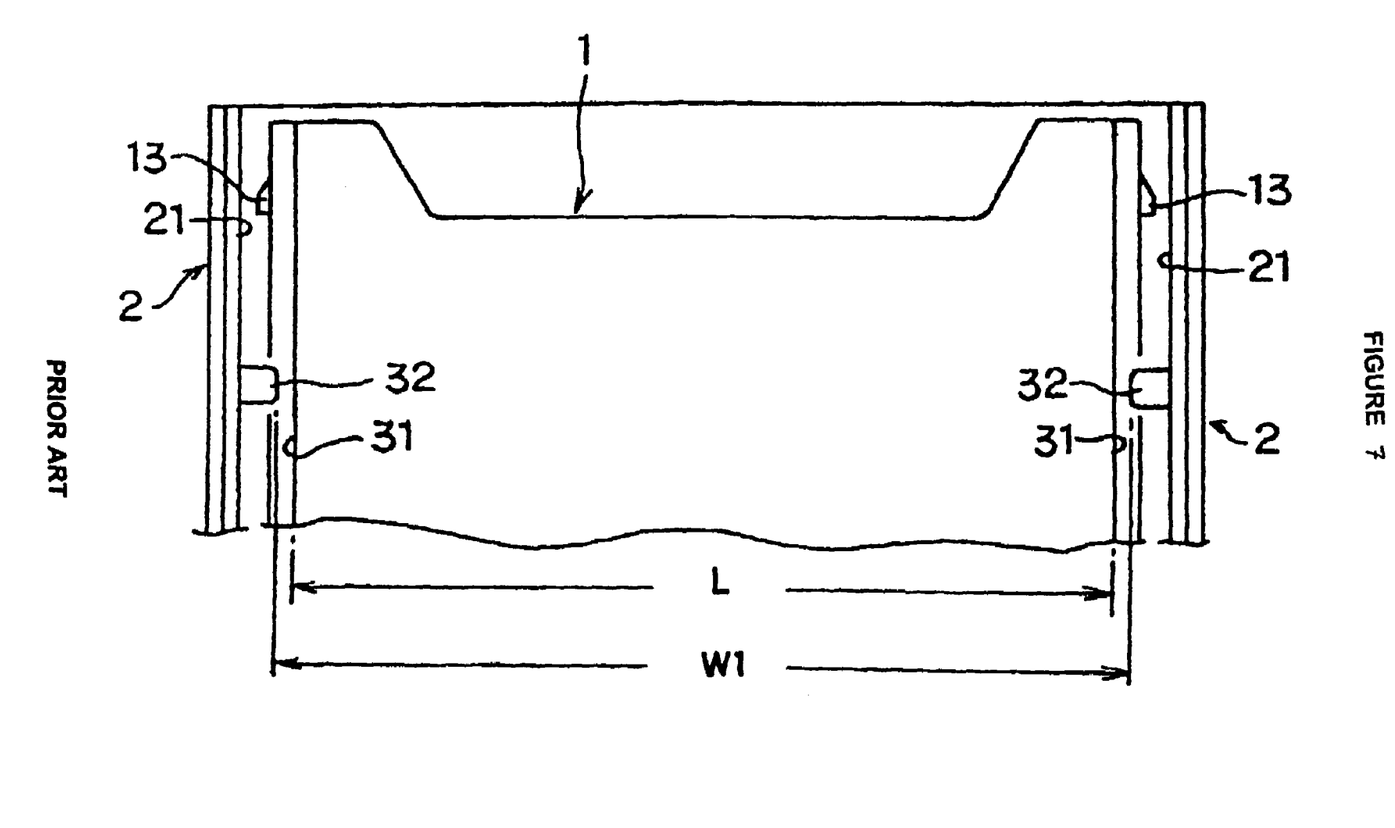
FIG. 7 is an enlarged view of the essence of the conventional disk apparatus.

And one pair of fore position regulating pieces 32, 32, left and right, are located on both sides of the disk tray 1 across the left and right guide ways 31, 31 when the disk tray 1 completes carrying the disk into the housing 2, the opposed interval W1 between them being slightly wider than the mutual interval L between the left and right guide ways 31, 31, as shown in greater scale in FIG. 7. Also, the one pair of rear position regulating pieces 33, 33, left and right, are formed in the same way as the fore position regulating pieces 32, 32, the opposed interval between one pair of rear position regulating pieces 33, 33, left and right, being identical to the opposed interval W1 between one pair of fore position regulating pieces 32, 32, left and right, and slightly wider than the mutual interval L between the left and right guide ways 31, 31, as shown in FIG. 5. The opposed interval W1 between the left and right fore position regulating pieces 32, 32, or the opposed interval between the left and right rear position regulating pieces 33, 33, and the mutual interval between the left and right guide ways 31, 31 for the disk tray 1 are defined in the above relation, thereby making loose the guide action by the guide mechanism 3, because it is necessary to suppress the load required to drive the disk tray 1 to carry in or out the disk and arrange the disk at the home position inside the housing 2 without great misregistration at the time of completing carrying in or out the disk.

Moreover, the anti-slip lugs 13, 13 are provided to the left and right in the fore end part of the disk tray 1, as shown in FIG. 5 or 7. The anti-slip lugs 13 have a function of preventing the disk tray 1 from slipping out of the housing 2 by engaging the left and right stoppers (not shown) included at the rear end portions of the housing 2. In the disk apparatus as illustrated, the anti-slip lugs 13, 13 are disposed opposite to the left and right sidewall inner faces 21, 21 for the housing 2.

On the other hand, the in-and-out movement of the disk tray 1 into or out of the housing 2 is performed by a rack 41 provided on the back side of the disk tray 1 and a pinion 42 having a motor (not shown) installed on the housing 2 as a drive source, in which the pinion 42 is meshed with the rack 41.

In this conventional disk apparatus, after the disk loading is performed by enabling the disk tray 1 that is loaded with the disk at a retreated position to carry the disk into the home position inside the housing 2, the disk is passed at the home position from the disk tray 1 to a turntable, not shown, and rotated together with the turntable so that an optical pickup, not shown, scans the disk face to perform the recording or reproduction. Also, after the disk is passed from the turntable to the disk tray 1, the disk tray 1 carries the disk out of the housing to perform the disk unloading.

In the disk tray 1 for performing the disk loading in the above way, it is required that the disk loaded on the disk tray 1 may be aligned with the turntable within a permissible range at the time of completing carrying the disk into the inside of the housing 2. If the precision of alignment is low, the disk maybe passed from the disk tray to the turntable incorrectly, thereby degrading the performance of subsequent recording or reproduction, or making the recording or reproduction difficult to cause various troubles.

On the other hand, as a prior example, it is well known that the guide mechanism for guiding the in-and-out movement of the disk tray is formed by slidably fitting the end portion of the disk tray into the guide groove formed in a base chassis as the housing (e.g., refer to JP-A-11-328801). Also, to make the in-and-out movement of the disk tray smoother, it is well known that the disk tray is obliquely moved at will (e.g., refer to JP-A-5-266563).

However, in the conventional disk apparatus as shown in FIGS. 5 to 7, if the guiding operation of the guide mechanism 3 is loose as described above, a situation may occur that the disk tray 1 guided by the guide mechanism 3 is moved obliquely to carry the disk into the housing 2. Particularly, when a rotational drive force of the pinion 41 is transmitted to one portion of the rack 41 provided at a biased position on the back side of the disk tray 1, the disk tray 1 loosely guided by the guide mechanism 3 inclined to the left or right may be moved (obliquely) toward the inside of the housing 2, so that the disk tray 1 is kept inclined at the time of completing carrying in the disk, as shown in FIG. 5. In this way, if the disk tray 1 is kept inclined at the time of completing carrying in the disk, a problem arises that the alignment precision of the disk is degraded due to some cause and the disk is incorrectly passed from the disk tray to the turntable, even though the looseness of the guide mechanism 3 is decided to the extent of suppressing the load required to drive the disk tray 1 to carry in or out the disk and arranging the disk at the home position inside the housing 2 without great misregistration at the time of completing carrying in the disk.

In this respect, the above-cited prior example involves a technique that the guide mechanism loosely guides the disk tray simply, or a technique that the disk tray is obliquely moved at will, and can not solve the above-mentioned problems.

SUMMARY OF THE INVENTION

This invention has been achieved in the light of the above-mentioned problems, and it is an object of the invention to provide a disk apparatus in which a disk is placed at the home position within a housing at high precision of alignment at the time of completing carrying in the disk without having influence on the load required to drive a disk tray.

A disk apparatus of the invention includes a guide mechanism for guiding the in-and-out movement of a disk tray into or out of a housing, the disk tray carrying a disk into a home position within the housing or out of the housing, the guide mechanism having the left and right parallel guide ways provided on the disk tray and extending in the movement direction of the disk tray, one pair of position regulating pieces like projections disposed oppositely to the left and right in the front part of the housing and located on both sides of the disk tray across the left and right guide ways when the disk tray completes carrying the disk into the housing, in which the opposed interval between the one pair of position regulating pieces is wider than the mutual interval between the left and right guide ways, and the anti-slip lugs for preventing the disk tray from slipping out of the housing by engaging the stoppers provided at the rear end portion of the housing to the left and right of the front end portion of the disk tray, the anti-slip lugs being disposed opposite to the inner faces of left and right side walls of the housing.

And the projecting width of one pair of position regulating pieces from the housing is longer, the opposed interval between the position regulating pieces being closer to the mutual interval between the left and right guide ways, or equalized to the interval between the left and right guide ways.

In the disk apparatus with this constitution, the left and right guide ways of the disk tray that completes carrying the disk into the housing are placed between one pair of position regulating pieces like projections opposed at the interval closer to or equivalent to the mutual interval between the guide ways, so that the disk is aligned at the home position within the housing at high precision. However, the position regulating pieces contact with the guide ways only at a stage immediately before the disk tray completes carrying the disk into the housing, whereby there is less influence on the load required to drive the disk tray.

In this invention, the left and right guide ways are lacked in the front end portions opposed to the position regulating pieces at the stage immediately before the disk tray completes carrying the disk into the housing, the lacked portions being formed as the dead spaces for receiving the position regulating pieces, and the inclined nominal guide ways are provided at the lacked end of the guide ways, the nominal guide ways allowing the position regulating pieces to slide and ride on the guide ways when the disk tray completes carrying the disk into the inside of the housing. With this constitution, though the position regulating pieces contact with the guide ways at the stage immediately before the disk tray completes carrying the disk into the housing, both are not rubbed against each other in the lacked front end portion of the guide ways, whereby there is less influence on the load required to drive the disk tray.

The same operation is achieved by the following constitution. That is, the left and right guide ways are formed as run-off guide ways biased inwards to the left and right in the front end portions opposed to the position regulating pieces at a stage immediately before the disk tray completes carrying the disk into the housing, the dead spaces for receiving the position regulating pieces are formed outside the run-off guide ways, and the inclined nominal guide ways are provided across the rear end of the run-off guide ways and the lacked end of the guide ways, the nominal guide ways allowing the position regulating pieces to slide and ride on the guide ways when the disk tray completes carrying the disk into the inside of the housing. In this case, it is desirable that the anti-slip lugs has a projecting width enough to prevent the fore position regulating pieces having entered the dead spaces from contacting the run-off guide ways by contacting the side wall inner faces of the housing, before the position regulating pieces contact the run-off guide ways, when the disk tray is obliquely moved to carry the disk into the inside of the housing. In this way, even when the disk tray is obliquely moved, it is possible to avoid a situation where the position regulating pieces contact the run-off guide ways and do not ride on the nominal guide ways, the load required to drive the disk tray is increased, or the disk tray is oscillated when the position regulating pieces slide on the nominal guide ways to correct the oblique movement of the disk tray. Consequently, the disk is placed at home position within the housing at high precision of alignment.

A disk apparatus of the invention is embodied by adopting the following constitution.

That is, there is provided a disk apparatus including a guide mechanism for guiding the in-and-out movement of a disk tray into or out of a housing, the disk tray carrying a disk into a home position within the housing or out of the housing, the guide mechanism having the left and right parallel guide ways provided in the disk tray and extending in the direction where the disk tray is moved in or out, one pair of fore position regulating pieces like projections disposed oppositely to the left and right in the front part of the housing and located on both sides of the disk tray across the left and right guide ways for the disk tray that completes carrying the disk into the housing, in which the opposed interval between one pair of fore position regulating pieces is wider than the mutual interval between the left and right guide ways, and the anti-slip lugs for preventing the disk tray from slipping out of the housing by engaging the stoppers provided at the rear end portion of the housing to the left and right of a front end portion of the disk tray, the anti-slip lugs being disposed opposite to the inner faces of left and right side walls of the housing, characterized in that each of the left and right guide ways is a straight flat face, and one pair of rear position regulating pieces like projections located on both sides across the left and right guide ways to the left and right of a rear part of the housing, and spaced with a wider interval than the mutual interval between the guide ways are disposed oppositely, in which the projecting width of one pair of fore position regulating pieces from the housing is longer, the opposed interval between the fore position regulating pieces being closer to the interval between the left and right guide ways, or equalized to the interval between the left and right guide ways, in which the left and right guide ways are formed as run-off guide ways biased inwards to the left or right in the front end portions opposed to the fore position regulating pieces at a stage immediately before the disk tray completes carrying the disk into the housing, the dead spaces for receiving the fore position regulating pieces are formed outside the run-off guide ways, and the inclined nominal guide ways are provided across the rear end of the run-off guide ways and the lacked end of the guide ways, the nominal guide ways allowing the fore position regulating pieces to slide and ride on the guide ways when the disk tray completes carrying the disk into the inside of the housing, and in which the anti-slip lugs has a projecting width enough to prevent the fore position regulating pieces having entered the dead spaces from contacting the run-off guide ways by contacting the side wall inner faces of the housing, before the fore position regulating pieces contact the run-off guide ways, when the disk tray is obliquely moved to carry the disk into the inside of the housing.

Also, the invention provides an improved disk apparatus having the following constitution. That is, there is provided a disk apparatus including a guide mechanism for guiding the in-and-out movement of a disk tray into or out of a housing, the disk tray carrying a disk into a home position within the housing or out of the housing, and a disk drive mechanism consisting of a rack provided at one position biased to the left or right on the back side of the disk tray and a pinion having a motor installed on the housing as a drive source, the pinion being meshed with the rack, the guide mechanism having the left and right parallel guide ways provided on the disk tray and extending in the direction where the disk tray is moved in or out, one pair of fore position regulating pieces like projections disposed oppositely to the left and right in the front part of the housing and located on both sides of the disk tray across the left and right guide ways when the disk tray completes carrying the disk into the housing, in which the opposed interval between one pair of fore position regulating pieces is wider than the mutual interval between the left and right guide ways, and the anti-slip lugs for preventing the disk tray from slipping out of the housing by engaging the stoppers provided at the rear end portion of the housing to the left and right of a front end portion of the disk tray, the anti-slip lugs being disposed opposite to the inner faces of left and right side walls of the housing, characterized in that each of the left and right guide ways is a straight flat face, and one pair of rear position regulating pieces like projections located on both sides across the left and right guide ways to the left and right of a rear part of the housing, and spaced with a wider interval than the mutual interval between the guide ways are disposed oppositely, in which the projecting width of the one pair of fore position regulating pieces from the housing is longer, the opposed interval between the fore position regulating pieces being closer to the mutual interval between the left and right guide ways, or equalized to the mutual interval between the left and right guide ways, in which the left and right guide ways are formed as run-off guide ways biased inwards to the left and right in the front end portion opposed to the fore position regulating pieces at a stage immediately before the disk tray completes carrying the disk into the housing, the dead spaces for receiving the fore position regulating pieces are formed outside the run-off guide ways, and the inclined nominal guide ways are provided across the rear end of the run-off guide ways and the lacked end of the guide ways, the nominal guide ways allowing the fore position regulating pieces to slide and ride on the guide ways when the disk tray completes carrying the disk into the inside of the housing, in which the open angle θ of the nominal guide way from the guide way is decided in a range from 110° to 135°, and in which the anti-slip lugs prevents the fore position regulating pieces having entered the dead spaces from contacting the run-off guide ways by contacting the side wall inner faces of the housing, before the fore position regulating pieces contact the run-off guide ways, when the disk tray carries the disk into the inside of the housing by providing a relation a>b>c where a is the interval between the run-off guide way and the fore position regulating piece when completing carrying the disk into the inside of the housing, b is the interval between the anti-slit lug and the side wall inner face of the housing, and c is the interval between the fore position regulating piece and the guide way.

As described above, in the disk apparatus of this invention, the disk is placed at the home position within the housing at high precision of alignment at the time of completing carrying in the disk, without having influence on the load required to drive the disk tray, whereby the recording or reproduction performance of the disk by the optical pickup is enhanced without increasing the load of the drive motor for the disk tray.

Particularly, when the open angle θ of the nominal guide way from the guide way is decided in a range from 110° to 135°, and there is a relation a>b>c where a is the interval between the run-off guide way 36 of the disk tray 1 and the fore position regulating piece 32 when completing carrying the disk into the inside of the housing, b is the interval between the anti-slit lug 13 and the side wall inner face 21 of the housing 2, and c is the interval between the fore position regulating piece 32 and the guide way 31, the load required for driving the disk tray 1 is made as small as possible, the disk tray is operated quite smoothly, and the loading or unloading of the disk, and the operation of passing the disk to the turntable after the disk loading are improved in the operation reliability. Furthermore, there is the great effect that the oblique movement of the disk tray is corrected securely when the disk tray carries the disk into the inside of the housing.

BRIEF DESCRIPTION OF THE DRAWINGS

These and other objects and advantages of this invention will become more fully apparent from the following detailed description taken with the accompanying drawings in which.

DETAILED DESCRIPTION OF THE PREFERRED EMBODIMENTS

Figure 1:
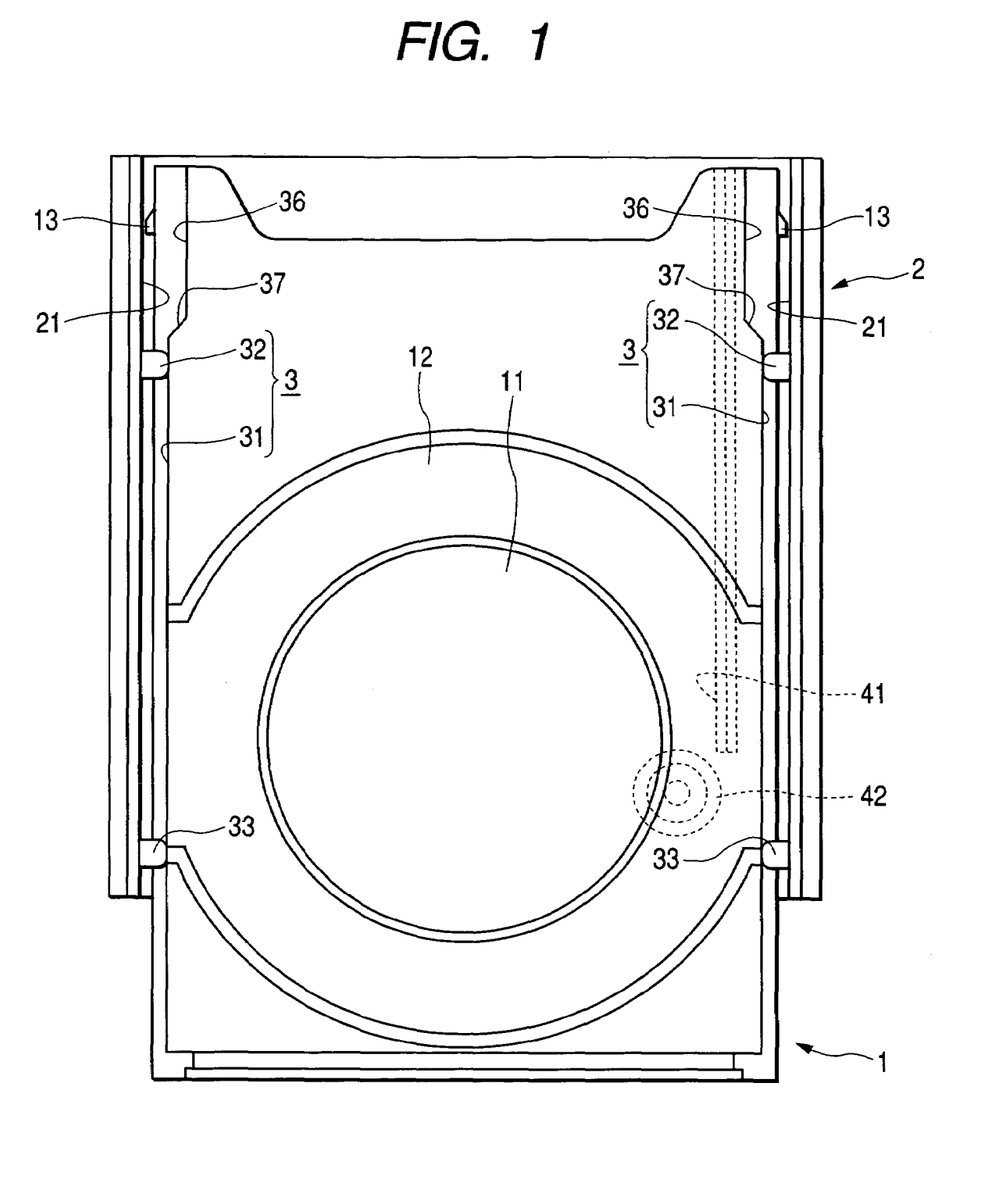
FIG. 1 is a schematic plan view of a disk apparatus according to the invention.
Figure 2:
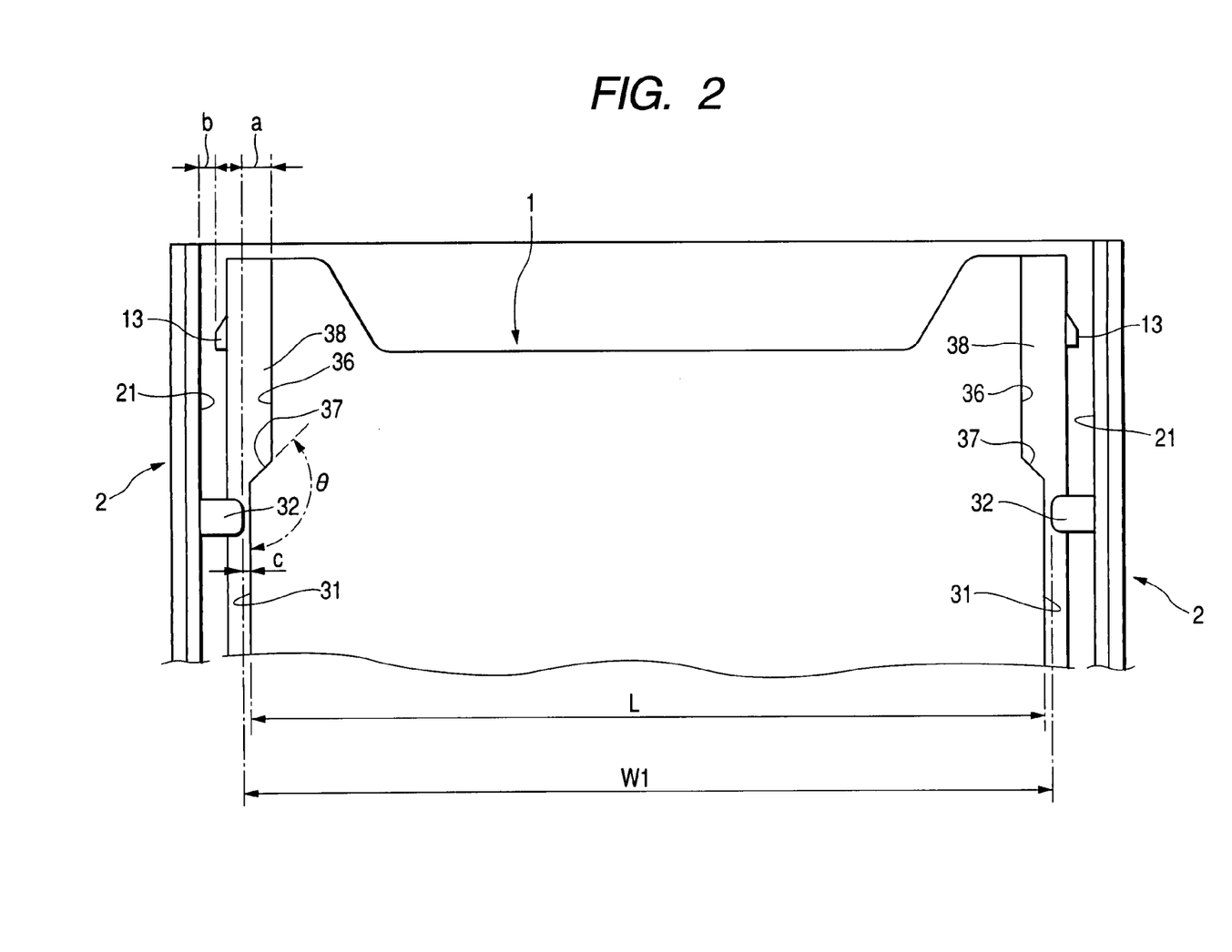
FIG. 2 is an enlarged view of the essence of the disk apparatus.

FIG. 1 is a schematic plan view of a disk apparatus according to the invention. FIG. 2 is an enlarged view of the essence of the disk apparatus. This disk apparatus according to this embodiment of the invention is different from the conventional disk apparatus as shown in FIG. 1 in that the projecting width of the fore position regulating pieces 32, 32, left and right, from the housing 2, is longer than conventional width, and the left and right guide ways 31, 31 for the disk tray 1 are provided with the run-off guide ways 36, 36, the run-off guide ways 36, 36 and the guide ways 31, 31 being linked by the nominal guide ways 37, 37. Other parts are the same as the conventional disk apparatus as shown in FIG. 1. More details are given below.

As shown in FIG. 2, in this embodiment, the projecting width of one pair of left and right fore position regulating pieces 32, 32 provided on the housing 2 from the housing is made longer, so that the opposed interval W between the fore position regulating pieces 32, 32 is shorter than that as shown in FIG. 7, and closer to the mutual interval L between the left and right guide ways 31, 31 on the disk tray 1. This opposed interval W may be equivalent to the mutual interval L between the left and right guide ways 31, 31.

Also, the front end portions of the left and right guide ways 31, 31 are formed as the run-off guide ways 36, 36 biased inwards to the left and right, the dead spaces 38, 38 for receiving the fore position regulating pieces 32, 32 are formed outside the run-off guide ways 36, 36, and the inclined nominal guide ways 37, 37 are formed across the rear end of the run-off guide ways 36, 36 and the lacked end of the guide ways 31, 31. And the run-off guide ways 36, 36 are formed in the front end portions of the guide ways 31, 31 opposed to the fore position regulating pieces 32 at the stage immediately before the disk tray 1 completes carrying the disk into the housing 2. Also, the nominal guide ways 37, 37 are formed as the inclined faces to enable the fore position regulating pieces 32, 32 to slide and ride on the guide faces 31, 31, when the disk tray 1 completes carrying the disk into the inside of the housing 2.

Moreover, the anti-slip lugs 13, 13 provided to the left and right in the front end part of the disk tray 1 have a projecting width enough to prevent the fore position regulating pieces 32, 32 having entered the dead spaces 38 from contacting the run-off guide ways 36, 36, by contacting the side wall inner faces 21, 21 of the housing 2, before the fore position regulating pieces 32, 32 contact the run-off guide ways 36, 36, when the disk tray 1 is obliquely moved to carry the disk into the inside of the housing 2. More specifically, the interval b between the anti-slip lug 13 and the side wall inner face 21 of the housing 2 is shorter than the interval a between the run-off guide way 36 of the disk tray 1 and the fore position regulating piece 32, when the disk is placed at the home position inside the housing 2 at high precision of alignment, as shown in FIG. 2.

Figure 3:
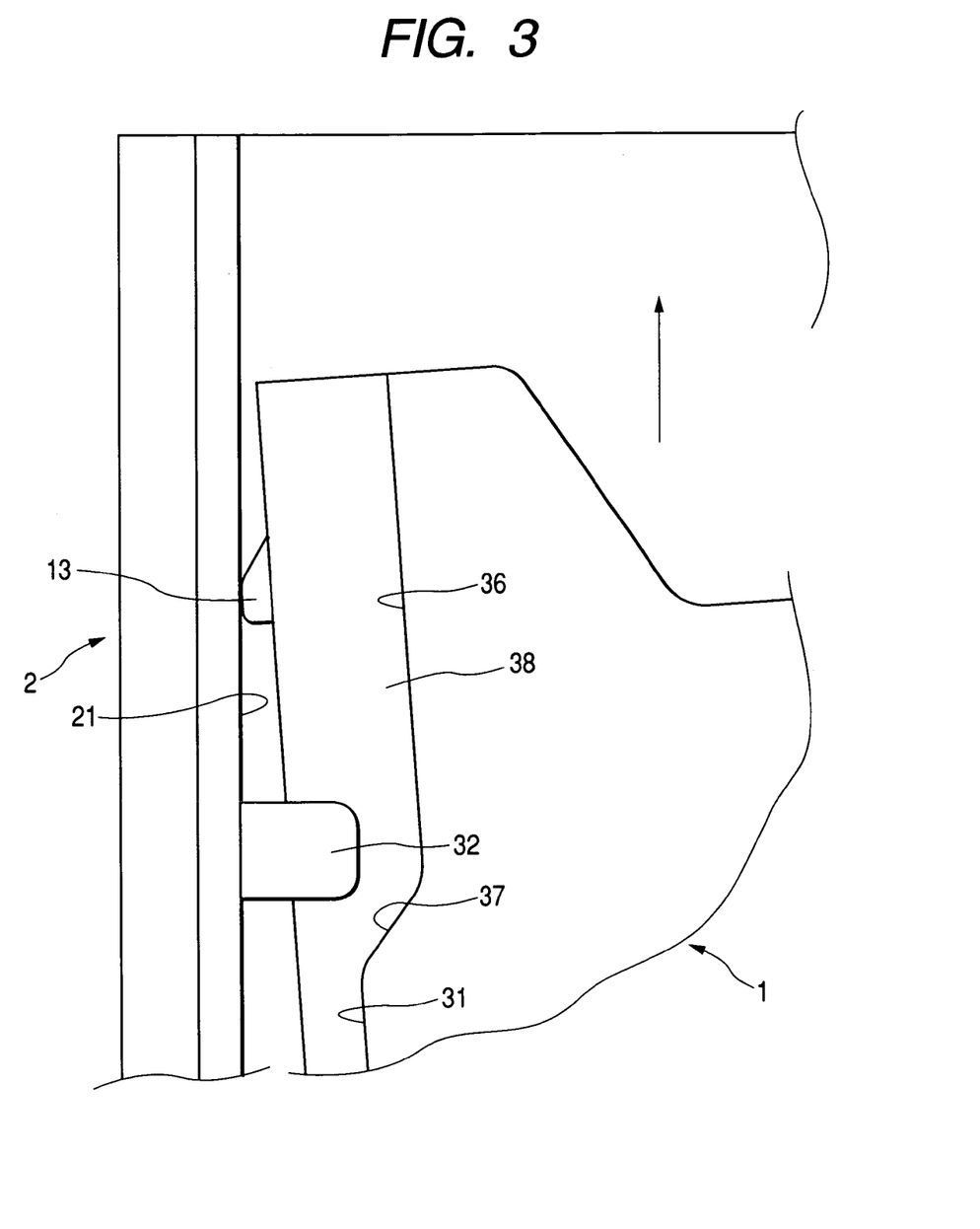
FIG. 3 is an explanatory view showing a state where a disk tray is obliquely moved.

In the disk apparatus with this constitution, the position regulating pieces 32, 32 do not contact with the guide ways 31 or the run-off guide ways 36 at the stage immediately before the disk tray 1 completes carrying the disk into the inside of the housing 2, even when the disk tray 1 is obliquely moved. That is, when the disk tray 1 is obliquely mode, the anti-slip lugs 13 prevent the fore position regulating pieces 32 having entered the dead spaces 38 from contacting the run-off guide ways 36 by contacting the side wall inner faces 21 of the housing 2, whereby the fore position regulating pieces 32 do not contact with the guide ways 36, and the guide ways 31 are not opposed to the fore position regulating pieces 32, so that the fore position regulating pieces 32 do not contact with the guide ways 31, as shown in FIG. 3. Accordingly, even when the disk tray 1 is obliquely moved, it is possible to suppress a situation where the position regulating pieces 32 contact the run-off guide ways 36 or do not ride across the nominal guide way 37, causing an increased load required for driving the disk tray 1, and an oscillating movement of the disk tray 1 when the position regulating pieces 32 slide on the nominal guide ways 37 to correct the oblique movement of the disk tray 1, whereby the disk is placed at the home position inside the housing at high precision of alignment.

Figure 4:
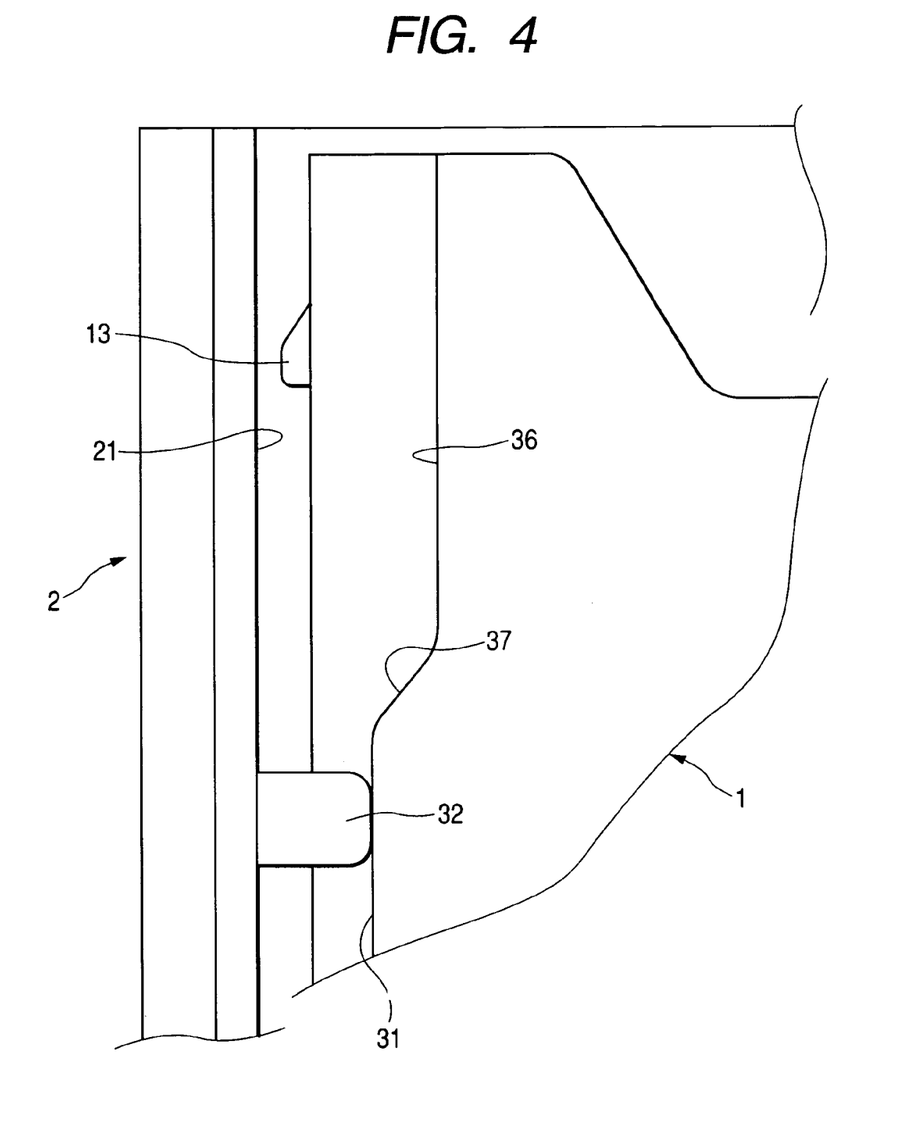
FIG. 4 is an explanatory view showing a state where the disk tray has carried in a disk.

When the disk tray 1 is further moved forward from the stage immediately before completion of carrying in the disk and is about to complete carrying the disk into the home position, namely a position opposed to the turntable inside the housing 2, the fore position regulating pieces 32 slide on the nominal guide ways 37. Then, when the disk tray 1 has completed carrying the disk into the home position inside the housing 2, namely the opposed position to the turntable, the fore position regulating pieces 32 ride across the nominal guide ways 37 and ride on the guide ways 31, as shown in FIG. 4. Consequently, the oblique movement is corrected by the left and right guide ways 31, 31 of the disk tray 1 disposed between the left and right fore position regulating pieces 32, 32, so that the disk is placed at the home position (concentric with the turntable) inside the housing 2 at high precision of alignment. In this case, since there is any influence on the load required for driving the disk tray 1 only when the fore position regulating pieces 32 ride across the nominal guide ways 37 and ride on the guide ways 31, the increased load is so small as to be negligible and substantially does not occur.

In this embodiment, though the front end portions of the guide ways 31 are recessed inwards and formed as the run-off guide ways 36, the run-off guide ways 36 may be omitted. That is, the front end portions of the guide ways 31, which are opposed to the position regulating pieces 32 at the stage immediately before the disk tray 1 completes carrying the disk into the inside of the housing 2, may be lacked, the dead spaces for receiving the position regulating pieces 32 may be formed at the lacked portions, and the inclined nominal guide ways 37 may be linked with the lacked end of the guide ways 31, the nominal guide ways 37 allowing the position regulating pieces 32 to slide and ride on the guide ways 31 when the disk tray 1 completes carrying the disk into the inside of the housing 2.

By the way, as a result of the careful research on the disk apparatus of this embodiment, it has been found that the opening angle $\theta$ of the nominal guide way 37 from the guide way 31 as shown in FIG. 2 is decided in a range from 110° to 135°, and when there is the relation such as a>b>c, where a is the interval between the run-off guide way 36 of the disk tray 1 and the fore position regulating piece 32 at the time of completion of carrying the disk into the inside of the housing 2, and b is the interval between the anti-slip lug 13 and the side wall inner face 21 of the housing 2, and c is the interval between the fore position regulating piece 32 and the guide way 31, the load required for driving the disk tray 1 is made as small as possible, the disk tray 1 is operated quite smoothly, and the loading or unloading of the disk, as well as the operation of passing the disk to the turntable after the disk loading are improved in the operation reliability.

The reason why the opening angle $\theta$ of the nominal guide way is preferably in the range from 110° to 135° is as follows. That is, if the opening angle is less than 110°, the load when the fore position regulating pieces 32 ride across the nominal guide ways 37 is excessively large, and in some cases, it is apprehended that the fore position regulating pieces 32 are engaged with and can not ride across the nominal guide ways 37. On the contrary, if the opening angle is more than 135°, the load when the fore position regulating pieces 32 ride across the nominal guide ways 37 is smaller, but the movement length of the disk tray 1 required to ride across the nominal guide ways is increased, so that the in-and-out movement of the disk tray 1 into or out of the housing is greater, causing the housing 2 of larger size. If the opening angle $\theta$ of the nominal guide way is decided in the range from 110° to 135°, the load when the fore position regulating pieces 32 ride across the nominal guide ways 37 is so small as to be negligible, and the movement length of the disk tray 1 required to ride across the nominal guide ways 37 and further the in-and-out movement of the disk tray 1 into or out of the housing 2 are suppressed, thereby avoiding the larger size of the housing 2. Also, if there is the relation a>b>c for the intervals a, b and c, the anti-slip lugs 13 securely contact the side wall inner faces. 21 of the housing 2 before the fore position regulating pieces 32 contact the run-off guide ways 36, so that the position regulating pieces 32 having entered the dead spaces 38 are securely prevented from contacting the run-off guide ways 37, when the disk ray 1 carries the disk into the inside of the housing 2. In addition, since the interval c is narrower than the intervals a and b, the anti-slip lugs 13 are left away from the side wall inner faces 21 of the housing 2, when the disk tray 1 completes carrying in the disk, whereby the disk tray 1 is corrected for the oblique movement because the left and right guide ways 31, 31 are regulated between the left and right fore position regulating pieces 32, 32. Particularly, when θ=122.01°, a=4.5 mm, b=1 mm and c=0.5 mm, the best results were obtained in terms of the load and the correction for oblique movement. The opposed interval W between the fore position regulating pieces 32, 32 was 119.5 mm, and the mutual interval L between the left and right guide ways 31, 31 was 117.76 mm.

What is claimed is:

1. A disk apparatus comprising:
a disk tray;
a housing; and
a guide mechanism for guiding the in-and-out movement of the disk tray into or out of the housing, wherein
the disk tray carries a disk into a home position within said housing or out of said housing;
the guide mechanism includes left and right parallel guide ways provided on said disk tray and extending in the direction where said disk tray is moved in or out, one pair of fore position regulating pieces like projections disposed oppositely to the left and right in the front part of said housing and located on both sides of said disk tray across said left and right guide ways for the disk tray that completes carrying the disk into said housing, in which an opposed interval between said one pair of fore position regulating pieces is wider than a mutual interval between said left and right guide ways;
anti-slip lugs prevent the disk tray from slipping out of the housing by engaging stoppers provided at the rear end portion of said housing to the left and right of the front end portion of said disk tray;
said anti-slip lugs are disposed opposite to the inner faces of left and right side walls of said housing;
each of said left and right guide ways is a straight flat face, and one pair of rear position regulating pieces like projections located on both sides across said left and right guide ways to the left and right of a rear part of said housing, and spaced with a wider interval than the mutual interval between the guide ways are disposed oppositely;
a projecting width of said one pair of fore position regulating pieces from said housing is longer, the opposed interval between said fore position regulating pieces being closer to the mutual interval between said left and right guide ways, or equalized to the mutual interval between said left and right guide ways;
said left and right guide ways are formed as run-off guide ways biased inwards to the left or right in the front end portions opposed to said fore position regulating pieces at a stage immediately before said disk tray completes carrying the disk into said housing, the dead spaces for receiving said fore position regulating pieces are formed outside said run-off guide ways, and inclined nominal guide ways are provided across the rear end of said run-off guide ways and the lacked end of said guide ways, said nominal guide ways allowing said fore position regulating pieces to slide and ride on said guide ways when said disk tray completes carrying the disk into the inside of said housing; and
said anti-slip lugs each has a projecting width enough to prevent the fore position regulating pieces having entered said dead spaces from contacting said run-off guide ways by contacting side wall inner faces of said housing, before said fore position regulating pieces contact said run-off guide ways, when the disk tray is obliquely moved to carry the disk into the inside of said housing.

2. A disk apparatus comprising:
a disk tray;
a housing; and
a guide mechanism for guiding the in-and-out movement of the disk tray into or out of the housing, wherein
the disk tray carries a disk into a home position within the housing or out of the housing;
the guide mechanism includes left and right parallel guide ways provided in the disk tray and extending in the direction where the disk tray is moved in or out, one pair of fore position regulating pieces like projections at least disposed oppositely to the left and right in the front part of the housing and located on both sides of the disk tray across the left and right guide ways for the disk tray that completes carrying the disk into the housing, in which an opposed interval between the one pair of fore position regulating pieces is wider than a mutual interval between the left and right guide ways;
anti-slip lugs prevent the disk tray from slipping out of the housing by engaging stoppers provided at the rear end portion of the housing to the left and right of a front end portion of the disk tray;
the anti-slip lugs are disposed opposite to inner faces of left and right side walls of the housing;
a projecting width of the one pair of fore position regulating pieces from the housing is longer, the opposed interval between the fore position regulating pieces being closer to the mutual interval between the left and right guide ways, or equalized to the mutual interval between the left and right guide ways;
the left and right guide ways are lacked in the front end portions opposed to the fore position regulating pieces at a stage immediately before the disk tray completes carrying the disk into the housing, the lacked portions being formed as the dead spaces for receiving the position regulating pieces, and inclined nominal guide ways are provided at the lacked end of the guide ways, the nominal guide ways allowing the position regulating pieces to slide and ride on the guide ways when the disk tray completes carrying the disk into the inside of the housing.

3. A disk apparatus comprising:
a disk tray;
a housing; and
a guide mechanism for guiding in-and-out movement of the disk tray into or out of the housing, wherein
the disk tray carries a disk into a home position within the housing or out of the housing;
the guide mechanism includes left and right parallel guide ways provided in the disk tray and extending in the direction where the disk tray is moved in or out, one pair of fore position regulating pieces like projections at least disposed oppositely to the left and right in the front part of the housing and located on both sides of the disk tray across the left and right guide ways for the disk tray that completes carrying the disk into the housing, in which an opposed interval between the one pair of fore position regulating pieces is wider than a mutual interval between the left and right guide ways;

anti-slip lugs prevent the disk tray from slipping out of the housing by engaging stoppers provided at the rear end portion of the housing to the left and right of a front end portion of the disk tray;

the anti-slip lugs are disposed opposite to the inner faces of left and right side walls of the housing;

a projecting width of the one pair of fore position regulating pieces from the housing is longer, the opposed interval between the fore position regulating pieces being closer to the mutual interval between the left and right guide ways, or equalized to the mutual interval between the left and right guide ways;

the left and right guide ways are formed as run-off guide ways biased inwards to the left and right in the front end portions opposed to the position regulating pieces at a stage immediately before the disk tray completes carrying the disk into the housing, the dead spaces for receiving the position regulating pieces are formed outside the run-off guide ways, and inclined nominal guide ways are provided across the rear end of the run-off guide ways and the lacked end of the guide ways, the nominal guide ways allowing the position regulating pieces to slide and ride on the guide ways when the disk tray completes carrying the disk into the inside of the housing.

4. The disk apparatus according to claim 3, wherein the anti-slip lugs each has a projecting width enough to prevent the fore position regulating pieces having entered the dead spaces from contacting the run-off guide ways by contacting side wall inner faces of the housing, before the position regulating pieces contact the run-off guide ways, when the disk tray is obliquely moved to carry the disk into the inside of the housing.

5. A disk apparatus comprising:

a disk tray;

a housing; and a guide mechanism for guiding in-and-out movement of the disk tray into or out of the housing, wherein the disk tray carries a disk into a home position within the housing or out of the housing;

a disk drive mechanism includes a rack provided at one position biased to the left or right on the back side of the disk tray and a pinion having a motor installed on the housing as a drive source, the pinion being meshed with the rack;

the guide mechanism includes left and right parallel guide ways provided on the disk tray and extending in the direction where the disk tray is moved in or out, one pair of fore position regulating pieces like projections disposed oppositely to the left and right in the front part of the housing and located on both sides of the disk tray across the left and right guide ways when the disk tray completes carrying the disk into the housing, in which an opposed interval between the one pair of fore position regulating pieces is wider than a mutual interval between the left and right guide ways;

anti-slip lugs prevents the disk tray from slipping out of the housing by engaging stoppers provided at the rear end portion of the housing to the left and right of a front end portion of the disk tray;

the anti-slip lugs are disposed opposite to the inner faces of left and right side walls of the housing;

each of the left and right guide ways is a straight flat face, and one pair of rear position regulating pieces like projections located on both sides across the left and right guide ways to the left and right of a rear part of the housing, and spaced with a wider interval than the mutual interval between the guide ways are disposed oppositely;

a projecting width of the one pair of fore position regulating pieces from the housing is longer, the opposed interval between the fore position regulating pieces being closer to the mutual interval between the left and right guide ways, or equalized to the mutual interval between the left and right guide ways;

the left and right guide ways are formed as run-off guide ways biased inwards to the left and right in the front end portions opposed to the fore position regulating pieces at a stage immediately before the disk tray completes carrying the disk into the housing, the dead spaces for receiving the fore position regulating pieces are formed outside the run-off guide ways, and inclined nominal guide ways are provided across the rear end of the run-off guide ways and the lacked end of the guide ways, the nominal guide ways allowing the fore position regulating pieces to slide and ride on the guide ways when the disk tray completes carrying the disk into the inside of the housing, in which the open angle $\theta$ of the nominal guide way from the guide way is decided in a range from 110° to 135°; and the anti-slip lugs prevent the fore position regulating pieces having entered the dead spaces from contacting the run-off guide ways by contacting the side wall inner faces of the housing, before the fore position regulating pieces contact the run-off guide ways, when the disk tray carries the disk into the inside of the housing by providing a relation $a>b>c$ where a is the interval between the run-off guide way and the fore position regulating piece when completing carrying the disk into the inside of the housing, b is the interval between the anti-slit lug and the side wall inner face of the housing, and c is the interval between the fore position regulating piece and the guide way.

* * * * *